United States Patent

Hardy et al.

[11] Patent Number: 6,005,701
[45] Date of Patent: Dec. 21, 1999

[54] OPTICAL EMISSION HEAD WITH LASER AND MODULATOR

[75] Inventors: Patrick Hardy, Baulon; Stéphans Hergault, La Mézière, both of France

[73] Assignee: Thomson-CSF, Paris, France

[21] Appl. No.: 08/776,604
[22] PCT Filed: Jul. 28, 1995
[86] PCT No.: PCT/FR95/01018
  § 371 Date: Apr. 14, 1997
  § 102(e) Date: Apr. 14, 1997
[87] PCT Pub. No.: WO96/06488
  PCT Pub. Date: Feb. 29, 1996

[30] Foreign Application Priority Data

Aug. 19, 1994 [FR] France ................................. 94 10153

[51] Int. Cl.$^6$ ............................ H04B 10/04; H04J 14/02
[52] U.S. Cl. .................... 359/180; 359/180; 359/181; 359/127; 359/187
[58] Field of Search .................................... 359/180, 181, 359/183, 154, 127, 161, 187

[56] References Cited

U.S. PATENT DOCUMENTS 5,401,957 3/1995 Suzuki et al. ........................ 250/227.21
5,548,436 8/1996 Ramachandran et al. .............. 359/187

Primary Examiner—Jason Chan
Assistant Examiner—Mohammad Sedighian
Attorney, Agent, or Firm—Oblon, Spivak, McClelland, Maier & Neustadt, P.C.

[57] ABSTRACT

Optical emitting head including a laser and an external optical modulator. The modulating signal is modulated by an electrical signal proportional to $1-e$, $e$ being the noise power superimposed onto the laser signal, before being applied to the optical modulator. The invention is suitable for fibre optical transmission applications.

9 Claims, 3 Drawing Sheets

OPTICAL EMISSION HEAD WITH LASER AND MODULATOR

BACKGROUND OF THE INVENTION

1. Field of the Invention

The present invention relates to the fibre optic transmission of analog signals and more particularly to the combination of a laser with an optical modulator to transmit analog signals.

2. Description of the Background

This combination is generally preferred to the use of direct-modulation lasers. Indeed, regarding direct-modulation lasers, the variation in current generating the amplitude modulation influences the wavelength emitted by the laser, and this variation, even when slight, degrades transmission performance if it results in the chromatic dispersion of the optical fibre.

The combination of certain lasers with an external optical modulator may however have another drawback due to the low-frequency, relaxation noise. This relaxation noise is manifested as a fluctuation in power emitted on the order of a few percent and corresponds to a narrow low-band spectrum. Such is the case for Glass-Erbium type lasers for which the central frequency of this spectrum is around 200 kHz. This noise, represented in FIG. 1a, causes a disturbance as described below in greater detail.

The modulating input of the optical modulator receives a signal consisting of one or more carriers (e.g., amplitude-modulated carriers). An example of this signal, represented in FIG. 1b, consists of an audio and video carrier. The frequency spectrum of the video carrier corresponds to a vestigial sideband amplitude modulation (referred to as VSB-AM). These 2 modulated carriers represent a channel within the field of television signal transmissions, and the modulating signal transmitted to the optical modulator can consist of a set of adjacent channels so as to constitute a multichannel frequency multiplex of vestigial sideband amplitude-modulated television signals. Multiplication of the optical signal with this RF modulating signal transposes the noise of the laser over to around the carriers of the RF signal, as represented in FIG. 1c. This noise ends up in the frequency sidebands if the latter have a width greater than a few tens of kilohertz, this being the case for the video modulating signal. After demodulation, the baseband video signal encounters the presence of noise of double power since the two noise "lines" around the video carrier are correlated while the spectrum of the video signal has reduced sideband. This noise level then exceeds the threshold of visibility of the video signal on the screen by a value of up to 10 or 12 dB, thus creating a "scribbling" effect on the image.

A "Feed Forward" solution is known that involves inserting, between the laser and the external modulator, a device for regulating the emitted power. This device is represented in FIG. 2. A coupler 2 taps off a portion of the power at the output of the laser 1 and to transmits it to an optical receiver 3 (with a built-in amplifier) which converts this optical signal into an electrical signal. The electrical signals controls a first external optical modulator 4 which acts as regulator.

A suitable choice of the coupling and gain values of the optical receiver enables the noise of the laser to be reduced effectively before the beam is transmitted to the second external optical modulator 5 receiving the RF modulating signals.

A first drawback of this solution relates to the insertion losses of the coupler and of the optical regulating modulator which greatly reduce the usable optical power of the laser. This occurs because the optical modulator, by nature, halves the power. Moreover, even without taking those insertion losses into account, the output power available after regulation is at most equal to the minimum value of the fluctuating power delivered by the laser. Another drawback relates to the setup of the device. The gain of the regulating chain symbolized by the optical receiver 3 has to be accurately adjusted. Additionally, the correction signal has to be perfectly in phase with the noise to be corrected. Finally, the cost of the optical modulator necessary for the power regulation is a consideration cost.

SUMMARY OF THE INVENTION

The objective of present invention is to alleviate the aforesaid drawbacks.

The present invention is directed to an optical emission head composed of a laser (emitting a signal with mean luminous power Po and instantaneous power Po (1+e), e being the noise power superimposed on the signal, referred to the mean power Po), and of an external optical modulator for modulating the optical signal originating from the laser on the basis of a modulating electrical signal M, characterized in that the modulating signal M' applied directly to the optical modulator is an electrical signal proportional to M (1−e).

The present invention makes it possible to overcome the drawbacks due to the variation in the wavelength of the laser, through the use of an optical modulator external to the laser. It also makes it possible to limit the insertion losses as compared with a "Feed-Forward" type power regulation device. Furthermore, it is less costly to construct and implement.

The actual modulating signal M' is produced on the basis of an electrical modulator receiving an original modulating signal M and a modulation control signal C. The electrical modulator can yield either a signal proportional to CM, or a signal of the form K2CM+K3M, where K2 and K3 are constants. In the first case the signal C must be proportional to (1−e); in the second case the signal C may be proportional to e. To produce the signal C, a portion of the instantaneous optical power is tapped off either directly from the output of the laser, or from the output of the optical modulator.

BRIEF DESCRIPTION OF THE DRAWINGS

The characteristics and advantages of the present invention will emerge better from the following description given by way of example and with reference to the appended drawings in which.

Figure 3:
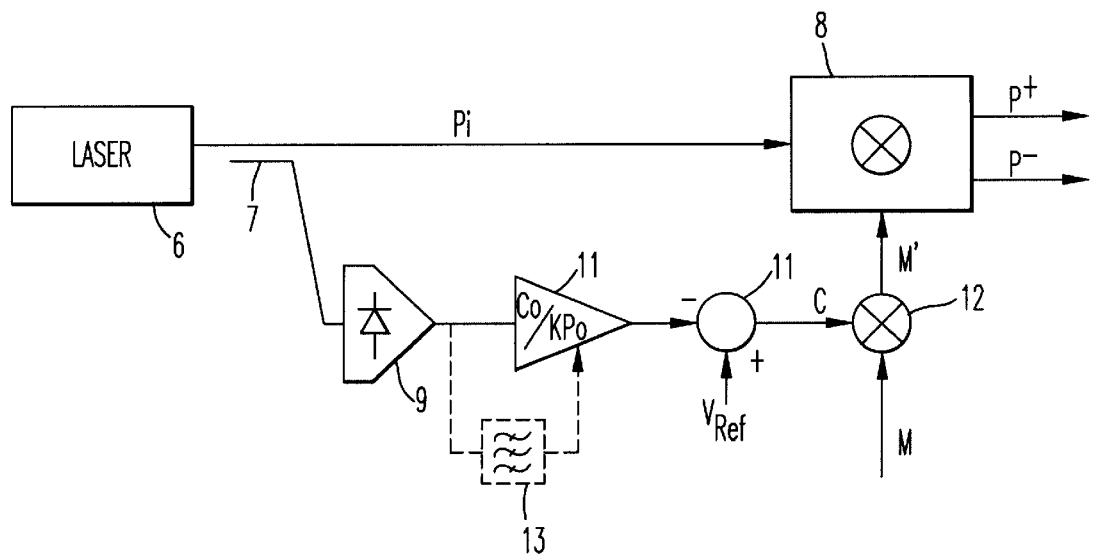
FIG. 3 represents a noise reduction device for an optical modulator according to the present invention.

The device according to the invention is represented in FIG. 3 and described below.

A laser 6 (e.g., a Glass-Ebrium type laser), is linked, via its output, to an optical coupler 7 allowing a small proportion of the optical power emitted by the laser to be tapped off. The output corresponding to the main pathway of this coupler is transmitted directly, via an optical fibre, to the input of an optical modulator 8 whose function is to receive a radio-frequency electrical signal so as to modulate the optical power as a function of this electrical signal. It is desired to obtain at the output of the optical modulator 8, an optical power Po (½+M) on a first output and Po (½−M) on a second output, where M represents the desired modulation ratio, lying between −½ and +½. This modulation ratio is represented by the variations of a radio-frequency signal applied to the device, which signal will also be denoted by M.

The output corresponding to the coupled pathway is linked, again via an optical fibre, to an optical receiver 9 which transforms the optical signals into electrical signals. The electrical signal available at the output of the receiver 9 is proportional to the power emitted from the laser Pi.

If Po is the mean power emitted by the laser and e is the noise power relative to this mean power, the power Pi emitted by the laser is given by Po (1+e).

Thus the electrical signal at the output of the optical receiver is equal to KPo (1+e), K being a constant depending on (1) the coupling coefficient of the optical coupler 7, (2) the losses in the optical fibre linked to the optical receiver and (3) the coefficient of transformation of the optical power into electrical voltage of the optical receiver. Below it is assumed that the receiver actually delivers a voltage and K is then expressed in volts/watts. Similar reasoning could be applied if the receiver delivered a current.

This signal is transmitted to an amplifier 10 a gain Co/KPo, Co being a constant which will be explained below, and then to a first input of a subtractor 11. That input is subtracted from a voltage applied to the second input and has the value $V_{ref}=2Co$. The optical receiver 9 and amplifier 10 together have a passband such that the frequencies of variations of instantaneous power (a few hundred kHz for example) are retained. The signal obtained at the output of the subtractor thus takes the value:

$$C = -\frac{Co}{KP_o} \times KPo(1+e) + 2Co = (1-e)Co$$

The subtractor 11 is readily embodied by applying an offset voltage to the amplifier 10.

Figure 1A:
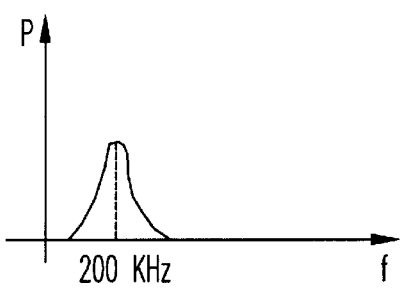
FIG. 1a represents the noise power of a Glass-Erbium type laser.
Figure 1B:
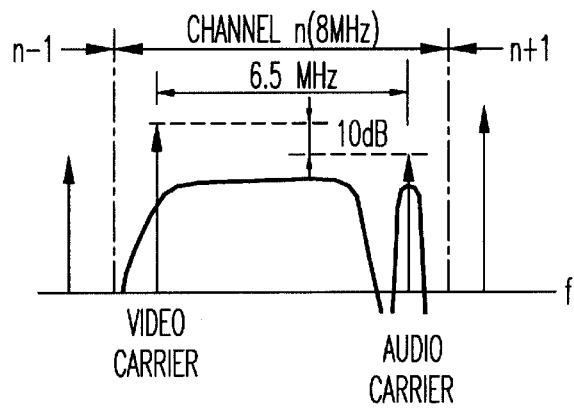
FIG. 1b represents the frequency spectrum of an RF modulating signal.
Figure 1C:
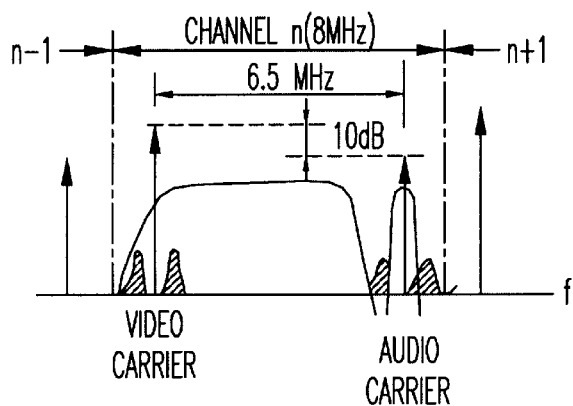
FIG. 1c represents the frequency spectrum at the output of the optical modulator.
Figure 2:
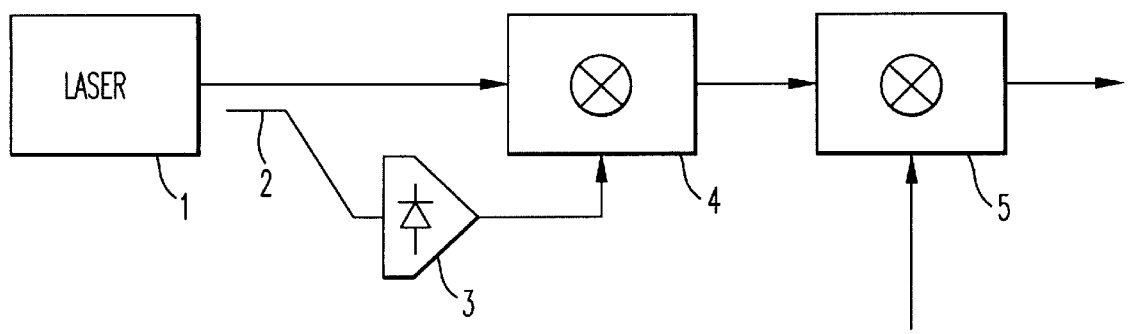
FIG. 2 represents a prior art device for automatically controlling the laser power transmitted.

The signal C feeds the modulating input of an electrical modulator 12 of multiplier type. Then the signal to be modulated M is transmitted to a second input. This signal M consists for example of frequency-multiplexed RF radio-frequency television signals, or the type described in FIG. 1b. This electrical modulator carries out amplitude-modulation of the RF signal via the signal C=Co (1 −e) to yield a modulated signal M' of the form:

M'=M (1−e)

Co is the value of the signal C when the instantaneous power Pi is equal to the mean power Po and in this case the actual modulating signal M' is equal to the signal M representing the desired modulation.

This signal M' is transmitted to the optical modulator 8 on its modulating input. This modulator generally has 2 complementary optical outputs P⁺ and P⁻, each with half the power of the input power for zero modulation. Neglecting the coupling losses and transmission losses over the main pathway of the coupler 7, the outputs P⁺ and P⁻ have the value, when a modulating signal M' is present:

P⁺=P_i(½+M')

P⁻=P_i(½+M')

and, neglecting the second-order terms for the noise e which is small compared with unity:

$$P^+ = P_o(1+e)\left[\frac{1}{2} + M(1-e)\right] \cong P_o\left(\frac{1+e}{2} + M\right)$$

$$P^- \cong P_o\left(\frac{1+e}{2} - M\right)$$

There is no longer any term in M.e corresponding to noise within the useful band of the modulating signal.

Only the low-frequency noise $$\frac{P_o \cdot e}{2}$$

is present at the output, but it does not disturb the RF carriers since it is outside the useful spectrum of the modulating signal. Thus, the modulated signal is hardly affected any longer by the noise of the laser.

This device presupposes, however, that the mean power Po is fixed, the gain of the amplifier 10 being calculated as a function of Po. In the case in which this value fluctuates over time, for example as a function of temperature or the aging of the laser, an improvement of the device consists in measuring this mean power Po using a low-pass filter, eliminating the fluctuations in instantaneous power, so as to control the gain of the amplifier 10 on the basis of this value. This improvement is represented by dashed lines in FIG. 3 and consists in tapping off the signal at the output of the optical receiver 9 so as to send it through a low-pass filter 13, with a cutoff frequency for example of the order of one kilohertz thereby eliminating the spectrum of the noise. Then the gain of the amplifier 10 is controlled by linking the output of this filter to the gain control input of the amplifier 10.

The modulator 12 here yields a signal M'=MC/Co. In the more general case in which the modulator is of the type yielding a signal M'=K2CM +K3M, where K2 and K3 are being constants, one representing the effectiveness of the modulator and the insertion losses, respectively the gain of the amplifier 10 must be given a value $$G = \frac{1}{K2KPo}$$

and the reference voltage Vref must be given a value Vref=(2−K3)/K2, in order for M' to be equal to M (1−e).

In the foregoing a subtractor was used because the signal present at the output of the amplifier 10 is proportional to (1+e). The signal delivered by the optical receiver (upstream or downstream of the amplifier 10) could also be filtered so as to eliminate the DC component KPo and keep only the noise component KPoe. This noise component can be applied to the electrical modulator 12 to yield a signal M'=M (1−e), by choosing the gain of the amplifier 10 on the basis of the coefficients K2 and K3 as will be described with regard to FIG. 4.

Furthermore, the phase adjustment required between the noise signal e contained in the laser signal to be modulated and that of the modulating signal M' is carried out here by adapting the length of the optical fibres; however, a phase-shifter circuit could also be used.

These described devices require the polarization of the optical wave to be preserved between the laser and the optical modulator, the latter's performance depending on this preservation. Consequently, the coupler at the output of the laser and the optical fibre between the coupler and the modulator generally have to be polarization preserving.

A variant of the devices described above makes it possible to dispense with this particular coupler which is of high cost. It also makes it possible to have as short as possible an optical fibre between laser and optical modulator. It is described with reference to FIG. 4.

A laser 14 is linked by optical fibre to an optical modulator 15. To one of the outputs $P^+$ or $P^-$ of this modulator is connected an optical coupler 16 which recovers a small portion of the optical signal so as to transmit it, via an optical fibre connected to its coupled output, to an optical receiver 17 consisting of an optoelectronic transducer. An amplifier 18 linked at its output amplifies and filters the electrical signal. This amplifier is linked to a phase shifter 19 whose output delivers a modulating signal C to an electrical modulator 20. On a second input this modulator 20 receives the signal M to be modulated and delivers at its output the modulated signal M' which is sent to the modulating input of the optical modulator 15.

The amplifier 18 extracts the noise of the laser e which is located in the low frequencies and which passes through the optical modulator, so as to modulate the signal M and yield a new modulating signal M' of the form M (1−e), such a signal limiting the degradation of the modulating signal M by the noise of the laser as indicated earlier.

To do this, the elements of the device satisfy the conditions calculated below.

The signal $P^-$ at the output of the optical modulator is of the form:

$$P^- = P_o (1+e)(\tfrac{1}{2}-M')$$

If $K_1$ is the coupling coefficient of the coupler 16, $\eta$ the efficiency or response coefficient in amps/watt of the optical receiver 17 and $R_T$ the calculated transistance of the amplifier 18, the output voltage S from the amplifier has the value:

$$S = K_1 \eta R_T P^- = K_1 \eta R_T P_o (1+e)(\tfrac{1}{2}-M')$$

(It is assumed that the receiver 17 delivers a current but the reasoning would be similar if it delivered a voltage).

In fact the passband of the amplifier is such that the DC signals and the signals at the modulating frequency are eliminated, this filtering possibly also being performed by a separate filter. The DC term $K_1 \eta R_T P_o/2$ disappears; the term proportional to M' representing a radio-frequency signal also disappears. Taking this filtering into account, the output S from the amplifier 18 therefore takes the value:

$$S = K_1/2 R_T P_o \eta e$$

The electrical modulator 20 yields, for its part, a signal M' from a signal M to be modulated and from a modulating signal C which, in general, may be put into the form:

$$M' = K_2 CM + K_3 M$$

where $K_2$ represents the effectiveness of the modulator 20 and $K_3$ is related to the insertion losses of the modulator.

If the signal C modulating the signal M is the voltage S, then the modulating signal M' of the optical modulator 15 takes the value:

$$M' = K_2 CM + K_3 M$$

$$= \frac{K_1}{2} K_2 R_T P_o \eta e M + K_3 M$$

For this signal M' to be proportional to M (1−e) and more particularly $K_3 M$ (1−e), the various coefficients satisfy the relation:

$$K_1 K_2 R_T P_o \eta = -2 K_3$$

$$\frac{K_1 K_2}{K_3} = - \frac{2}{R_T P_o \eta}$$

In order to overcome any possible variations in the power Po of the laser, it will be possible to construct the amplifier in such a way that its transistance $R_T$ is inversely proportional to Po.

The signal C in fact corresponds to the signal S after phase-shifting.

The phase-shifting circuit 19 makes it possible to preserve the phase condition between the correction signal C transmitted to the electrical modulator and the signal to be corrected, that is to say a zero phase shift between the noise signal e contained in the signal $P^-$ and the correction signal C; the phase shifter produces a phase shift which, partnered with a phase inversion in the optical receiver and with the phase shift due to the loop, causes a 360° phase shift in the neighborhood of the frequency of the peak in the relaxation noise spectrum, this being a narrow spectrum around 200 kHz in the case of a Glass-Erbium type laser. The delay time within the loop is of the order of 150 ns, this corresponding to a phase shift of some ten degrees for a signal at the frequency of 200 kHz. Thus, the phase shift produced by the phase shifter 19 is of the order of 170°.

The electrical modulator 20 must be aperiodic in relation to the modulating signal, that is to say its action on the RF signal must not depend on the RF frequency.

Figure 4:
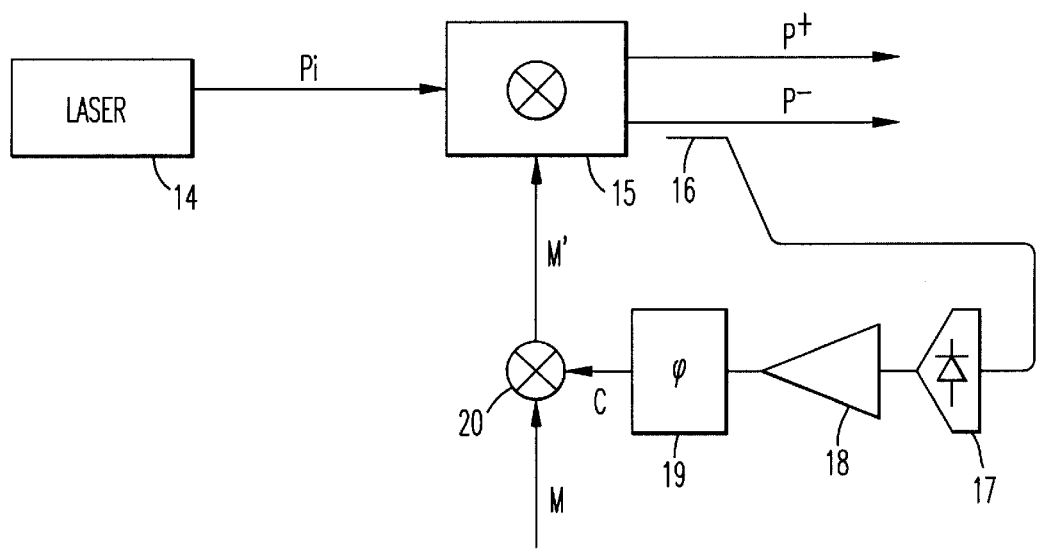
FIG. 4 represents an alternate embodiment of the present invention a variant of this device.

As explained with regard to FIG. 3, a subtractor could be used in FIG. 4 if the amplifier 18 yields a signal proportional to 1+e, that is to say without filtering the DC component, and filtering only the frequencies of the modulating signal M'.

Furthermore and more generally, the choice of an optical modulator with two complementary outputs is not essential for the embodiment of the invention. Nonetheless, it does make possible supplying simultaneously two series of subscribers to a cable optical transmission network by simultaneously exploiting these two outputs.

The coupling making it possible to feed the optical receiver and the electrical modulator can, quite obviously, be effected equally on either of these two outputs.

Figure 5:
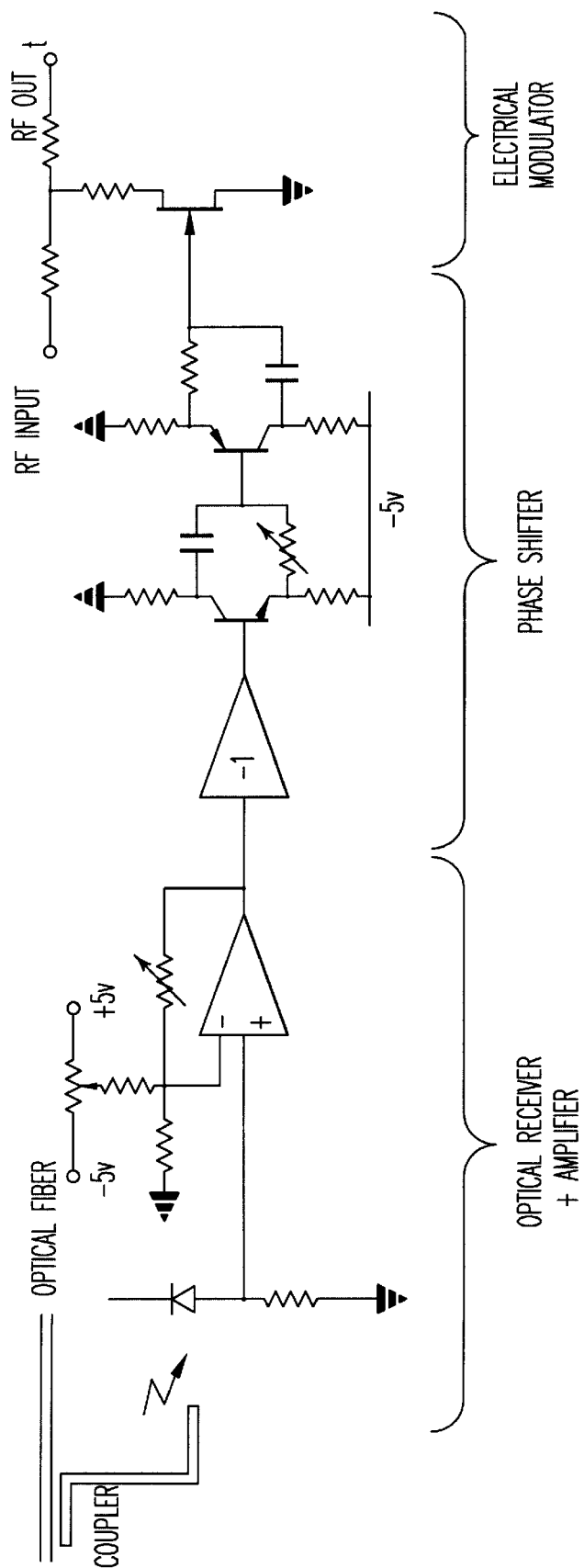
FIG. 5 represents another embodiment of the device according to the present invention.

A practical layout of the feedback loop acting on the electrical modulator of the device of FIG. 4 is represented in FIG. 5.

It consists in succession of an optical receiver+amplifier receiving the optical signal originating from the optical coupler and including a photodiode and an amplifier with variable resistance for setting the gain of the loop, of a phase shifter including an inverter circuit followed by 2 circuits having complementary transistors with adjustable resistance for setting the desired phase shift, then by an electrical modulator consisting of a gallium arsenide FET transistor acting as variable resistor. The original modulating signal is transmitted on the RF input and the RF output is linked to the input of the optical modulator.

We claim:

1. An optical emission system comprising:

a laser emitting an optical signal with a mean luminous power Po and an instantaneous power Po (1+e), where e is a power of noise superimposed on the optical signal as a function of the mean power Po;

an external optical modulator for modulating the optical signal originating from the laser based on an adjustable modulating signal M' applied directly to the optical modulator; and an electrical modulator having a modulating input fed with an electrical signal C constructed by sampling the optical signal and outputting the adjustable modulated output M' according to: M'=K$_2$CM+K$_3$M, where K$_2$ and K$_3$ are constants and M is a modulating electrical signal.

2. The optical emission system according to claim 1, further comprising:

an optical coupler connected to an output of the laser for tapping off a portion of the optical signal, an optical receiver for transforming the tapped-off optical signal into an electrical signal a is proportional to Po (1+e), a filter for eliminating a DC component from the electrical signal, and;

an amplifier with a gain inversely proportional to Po for amplifying the electrical signal.

3. The optical emission system according to claim 1, further comprising:

an optical coupler connected to the output of the laser for tapping off an optical signal an optical receiver for transforming the tapped-off optical signal into an electrical signal that is proportional to Po (1+e), an amplifier with a gain inversely proportional to Po for amplifying the signal from the optical receiver; and a subtractor for subtracting the amplified signal from a reference value.

4. The optical emission system according to claim 2, wherein the filter further comprises a filter for eliminating components at a modulating frequency.

5. The optical emission system according to claim 4, wherein the optical coupler utilizes a coupling coefficient K$_1$:

the optical receiver utilizes an efficiency η; and the filter and amplifier utilize a transistance R$_T$, the coupler, the optical receiver, the amplifier and the electrical modulator satisfying the relation;

$$\frac{K_1 K_2}{K_3} = -\frac{2}{R_T P_o \eta}$$

6. The optical emission subject according to claim 2, further comprising a phase shifter interposed between the output of the optical receiver and the modulating input of the electrical modulator thereby producing a phase shift such that the noise components of the modulating signal M' and of the optical signal at the input of the optical modulator are opposite in phase.

7. An optical emission system comprising:

a laser emitting an optical signal with a mean luminous power Po and an instantaneous power Po (1+e), where e is a power of noise superimposed on the optical signal as a function of the mean power Po;

an amplifier for receiving, at an input terminal, an electrical signal representing the optical signal and producing an amplified signal;

a low pass filter for receiving and applying the filtered signal to a gain control terminal of the amplifier;

an electrical modulator for receiving the amplified signal from the amplifier and modulating the amplified signal with a modulated signal M to produce an adjustable modulating signal M'; and an external optical modulator for modulating the optical signal originating from the laser based on the adjustable modulating signal M' applied directly to the optical modulator.

8. The optical emission system according to claim 7, further comprising:

an optical coupler connected to the output of the laser for tapping off an optical signal an optical receiver for transforming the tapped-off optical signal into the electrical signal that is applied to the input terminal of the amplifier, wherein the electrical signal is proportional to Po (1+e); and a subtractor for subtracting the amplified signal from a reference value.

9. The optical emission system according to claim 7, wherein the electrical modulator produces the adjustable modulating signal M' in proportion to M (1−e).

* * * * *